United States Patent
MacDonald et al.

(10) Patent No.: US 11,827,740 B2
(45) Date of Patent: Nov. 28, 2023

(54) CROSSLINKING COMPOSITIONS AND COATINGS FORMED THEREFROM

(71) Applicant: PPG Industries Ohio, Inc., Cleveland, OH (US)

(72) Inventors: Melissa Joan MacDonald, Pittsburgh, PA (US); Qi Zheng, Allison Park, PA (US); Abdulrahman Dawoud Ibrahim, Wexford, PA (US); Se Ryeon Lee, Pittsburgh, PA (US); Tsukasa Mizuhara, Gibsonia, PA (US); Christophe René Gaston Grenier, Pittsburgh, PA (US); Venkatachalam Eswarakrishnan, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 17/567,526

(22) Filed: Jan. 3, 2022

(65) Prior Publication Data
US 2022/0127411 A1    Apr. 28, 2022

Related U.S. Application Data

(63) Continuation of application No. 16/655,662, filed on Oct. 17, 2019, now Pat. No. 11,242,430.

(51) Int. Cl.
| | | |
|---|---|---|
| C08G 59/14 | (2006.01) | |
| C08G 59/06 | (2006.01) | |
| C08G 59/32 | (2006.01) | |
| C09D 163/06 | (2006.01) | |
| C09D 163/10 | (2006.01) | |
| C08L 63/06 | (2006.01) | |
| C08K 5/25 | (2006.01) | |
| C08F 8/32 | (2006.01) | |
| C09D 5/44 | (2006.01) | |
| C08F 220/32 | (2006.01) | |
| C08F 220/34 | (2006.01) | |
| C09D 133/14 | (2006.01) | |

(52) U.S. Cl.
CPC ....... *C08G 59/1477* (2013.01); *C08G 59/063* (2013.01); *C08G 59/3227* (2013.01); *C09D 163/06* (2013.01); *C09D 163/10* (2013.01); *C08L 63/06* (2013.01)

(58) Field of Classification Search
None
See application file for complete search history.

(56) References Cited

U.S. PATENT DOCUMENTS

| | | |
|---|---|---|
| 2,643,250 A | 6/1953 | Stallman et al. |
| 4,197,409 A | 4/1980 | Lilburn |
| 6,849,631 B2 | 2/2005 | Carini |
| 2012/0142847 A1 | 6/2012 | Yang et al. |
| 2013/0079488 A1 | 3/2013 | Hitzler et al. |
| 2015/0291831 A1 | 10/2015 | Yamauchi et al. |

FOREIGN PATENT DOCUMENTS

| | | |
|---|---|---|
| CA | 2067401 A1 | 11/1992 |
| EP | 0511572 B1 | 6/1995 |
| EP | 0765922 A1 | 4/1997 |
| EP | 1490427 B1 | 3/2006 |
| EP | 3430062 A1 | 1/2019 |
| WO | 2013067646 A1 | 5/2013 |

OTHER PUBLICATIONS

Joseph, "Calculating VOC from MSDS", Metal Finishing, Mar. 2005, pp. 47-51, vol. 102, Issue 3, San Jose, CA.
Lin et al., "The new compound bis(p-phenylurazole)Sulfonic," MRI, Bulletin of Research and Development, vol. 5(1), pp. 1010-2744 (1991) (Year: 1991).

*Primary Examiner* — Randy P Gulakowski
*Assistant Examiner* — Ha S Nguyen
(74) *Attorney, Agent, or Firm* — Krisanne Shideler

(57) ABSTRACT

A crosslinking composition includes a compound having at least two functional groups that are each independently represented by Chemical Structure (I):

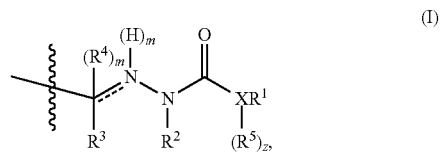

X is an oxygen, sulfur, or nitrogen; $R^1$ is an alkyl group, an aryl group, or an alkylaryl group; $R^2$, $R^3$, and $R^4$ are each independently an alkyl group, an aryl group, an alkylaryl group, or a hydrogen; $R^5$ is an alkyl group, an aryl group, an alkylaryl group, or a hydrogen; z is 0 when X is oxygen or sulfur and z is 1 when X is nitrogen; and when a double bond is formed between a carbon atom bonded to $R^3$ and an adjacent nitrogen, m is 0, and when a single bond is formed between the carbon atom bonded to $R^3$ and the adjacent nitrogen, m is 1.

19 Claims, No Drawings

CROSSLINKING COMPOSITIONS AND COATINGS FORMED THEREFROM

FIELD OF THE INVENTION

The present invention relates to crosslinking compositions and coatings formed therefrom.

BACKGROUND OF THE INVENTION

Crosslinking compositions contain one or more components that are capable of reacting and crosslinking to form coating layers and films. For instance, crosslinking compositions are commonly applied to substrates to form coatings that provide numerous properties including protective properties, decorative properties, and the like. These coatings are typically prepared from compositions that contain self-crosslinking compounds, and/or film-forming resins and crosslinkers that react with the film-forming resins. Due to their reactivity and ability to form high-performance coatings, isocyanate functional compounds are often used to form such coatings. However, isocyanates present health risks including irritation to skin and mucous membranes as well as environmental concerns. Thus, it is desirable to provide alternatives to isocyanates that can be used to form high-performance coatings.

SUMMARY OF THE INVENTION

The present invention relates to a crosslinking composition comprising a compound comprising at least two functional groups that are each independently represented by Chemical Structure (I):

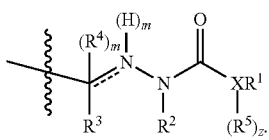

With respect to Chemical Structure (I), X is an oxygen, sulfur, or nitrogen; $R^1$ is an alkyl group, an aryl group, or an alkylaryl group; $R^2$, $R^3$, and $R^4$ are each independently an alkyl group, an aryl group, an alkylaryl group, or a hydrogen; $R^5$ is an alkyl group, an aryl group, an alkylaryl group, or a hydrogen; z is 0 when X is oxygen or sulfur and z is 1 when X is nitrogen; and when a double bond is formed between a carbon atom bonded to $R^3$ and an adjacent nitrogen, m is 0, and when a single bond is formed between the carbon atom bonded to $R^3$ and the adjacent nitrogen, m is 1. Further, (i) the compound comprises one or more additional functional groups that are reactive with the functional groups represented by Chemical Structure (I) such that the compound is self-crosslinkable; and/or (ii) the composition further comprises a film-forming resin comprising functional groups that are reactive with the functional groups represented by Chemical Structure (I) of the compound.

The present invention also relates to a coating formed from the crosslinking composition and substrates at least partially coated with the coating.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" compound, "a" film-forming resin, and the like refer to one or more of any of these items.

As indicated, the present invention relates to a crosslinking composition comprising a compound comprising at least two functional groups that are each independently represented by Chemical Structure (I):

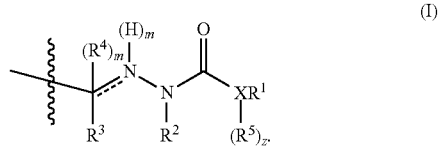

With respect to Chemical Structure (I), X is an oxygen, sulfur, or nitrogen; $R^1$ is an alkyl group, an aryl group, or an alkylaryl group; $R^2$, $R^3$, and $R^4$ are each independently an alkyl group, an aryl group, an alkylaryl group, or a hydrogen; $R^5$ is an alkyl group, an aryl group, an alkylaryl group, or a hydrogen; z is 0 (i.e. there is no $R^5$) when X is oxygen or sulfur and z is 1 when X is nitrogen; and when a double bond is formed between the carbon atom bonded to $R^3$ and the adjacent nitrogen, m is 0, and when a single bond is formed between the carbon atom bonded to $R^3$ and the adjacent nitrogen, m is 1.

As used herein, an "alkyl group" refers to a linear, branched, and/or cyclic monovalent, saturated hydrocarbon radical. The alkyl group may include, but is not limited to, a linear or branched $C_1$-$C_{30}$ monovalent hydrocarbon radical, or a linear or branched $C_1$-$C_{20}$ monovalent hydrocarbon radical, or a linear or branched $C_1$-$C_{10}$ monovalent hydrocarbon radical, or a linear or branched $C_1$ to $C_6$ monovalent hydrocarbon radical, or a linear or branched $C_1$ to $C_4$ monovalent hydrocarbon radical, such as methyl or ethyl. The alkyl group may also include, but is not limited to, a cyclic $C_3$-$C_{19}$ monovalent hydrocarbon radical, or a cyclic $C_3$-$C_{12}$ monovalent hydrocarbon radical, or a cyclic $C_5$-$C_7$ monovalent hydrocarbon radical. Further, the alkyl group can optionally comprise an interrupting heteroatom, functional group, or a combination thereof. For example, the alkyl group can be interrupted by: (i) a heteroatom including, but not limited to, an oxygen atom, a nitrogen atom, a sulfur atom, or a combination thereof; and/or (ii) a functional group including, but not limited to, an ester group, an ether group, a carbonyl group, an amide group, an amino group, or combinations thereof. Alternatively, the alkyl group can be free of interrupting heteroatoms and/or functional groups.

The term "linear" refers to a compound having a straight hydrocarbon chain, the term "branched" refers to a compound having a hydrocarbon chain with a hydrogen replaced by a substituent such as an alkyl group that branches or extends out from a straight chain, and the term "cyclic" refers to a closed ring structure. The cyclic groups also encompass bridged ring polycycloalkyl groups (or bridged ring polycyclic groups) and fused ring polycycloalkyl groups (or fused ring polycyclic groups).

As used herein, an "aryl group" refers to a substituent derived from an aromatic ring, such as a phenyl group for example. The aryl group can be derived from a monocyclic aromatic ring, a bicyclic aromatic ring, or a polycyclic aromatic ring. The aryl group can also include a heteroaryl group in which at least one carbon atom of the aromatic group is replaced by a heteroatom such as nitrogen, oxygen, sulfur, or a combination thereof. The aryl group can also include a substituted aryl group where at least one hydrogen thereof has been optionally replaced or substituted with a group that is other than hydrogen.

As used herein, the term "aromatic" refers to a cyclically conjugated hydrocarbon with a stability (due to delocalization) that is significantly greater than that of a hypothetical localized structure.

An "alkylaryl group" refers to alkyl-substituted aryl group. That is, an alkylaryl group, as used herein, is a substituent derived from an aromatic ring and which is substituted with a linear, branched, and/or cyclic monovalent, saturated hydrocarbon.

The alkyl group, aryl group, or alkylaryl group of $R^1$ and the nitrogen, sulfur, or oxygen of X can act as a cleavable blocking group that is removed upon exposure to a minimum temperature. As such, upon exposure to a minimum temperature, the alkyl group, aryl group, or alkylaryl group of $R^1$ and the nitrogen, sulfur, or oxygen of X are removed or cleaved, thereby allowing for additional reactions. The alkyl group, aryl group, or alkylaryl group of $R^1$ and the nitrogen, sulfur, or oxygen of X can be removed at a temperature of at least 60° C., at least 80° C., at least 100° C., at least 120° C., at least 140° C., or at least 160° C.

As indicated, when a double bond is formed between the carbon atom bonded to $R^3$ and the adjacent nitrogen, m is 0. The resulting functional group can be represented by Chemical Structure (II):

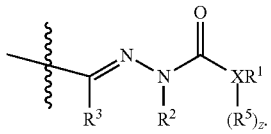

(II)

Alternatively, when a single bond is formed between the carbon atom bonded to $R^3$ and the adjacent nitrogen, m is 1. The resulting functional group can be represented by Chemical Structure (III):

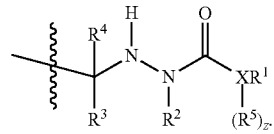

(III)

As indicated, the compound of the present invention comprises at least two functional groups, such as at least three functional groups or at least four functional groups, represented by Chemical Structure (I). The functional groups can comprise any combination of functional groups represented by Chemical Structure (I). For instance, the compound can comprise one or more functional groups represented by Chemical Structure (II), which is derived from Chemical Structure (I), and one or more functional groups represented by Chemical Structure (III), which is also derived from Chemical Structure (I).

The previously described compound can also comprise additional functional groups. Non-limiting examples of additional functional groups include hydroxyl groups, thiol groups, carboxylic acid groups, amine groups, epoxide groups, carbamate groups, amide groups, urea groups, isocyanate groups (including blocked isocyanate groups), and combinations thereof. The compound can also be free of any of the additional functional groups The compound can comprise various linkages that form the backbone and/or other structural portions, such as pendant groups or chains, of the chemical compound. Non-limiting examples of linkages include ester linkages, ether linkages, aromatic groups, or a combination thereof. As such, the compound of the present invention can comprise: (i) at least two functional groups represented by Chemical Structure (I); (ii) ester linkages, ether linkages, aromatic groups, or a combination thereof, for example; and optionally (iii) additional functional groups different from the functional groups represented by Chemical Structure (I).

The compound of the present invention can comprise a monomer that contains the functional groups represented by Chemical Structure (I), or a polymer that contains the functional groups represented by Chemical Structure (I). It is appreciated that the composition of the present invention can comprise a monomer and a polymer that both have functional groups represented by Chemical Structure (I).

As used herein, the term polymer refers to oligomers, homopolymers (e.g., prepared from a single monomer species), copolymers (e.g., prepared from at least two monomer species), terpolymers (e.g., prepared from at least three monomer species), and graft polymers. The term "resin" is used interchangeably with the term "polymer".

When the compound is a polymer, the functional groups represented by Chemical Structure (I) can form a pendant and/or terminal group on the polymer. A "pendant group," also referred to as a "side chain", is an offshoot from the polymer main chain and is not part of the main chain, and a "terminal group" refers to a functional group positioned at the end of the polymer main chain.

Further, when the compound is a polymer, it is appreciated that the compound can comprise various types of polymers provided that the polymer has two or more functional groups represented by Chemical Structure (I). Non-limiting examples of polymers that can form the compound include (meth)acrylate resins, polyurethanes, polyesters, polyamides, polyethers, polysiloxanes, epoxy resins, vinyl resins, copolymers thereof, and combinations thereof, and which comprise two or more functional groups represented by Chemical Structure (I). For instance, the compound can comprise a (meth)acrylate resin (i.e. an addition polymer derived from one or more monomers comprising (meth) acrylate groups) that comprises two or more functional groups represented by Chemical Structure (I). The term "(meth)acrylate" refers to the "methacrylate" and the "acrylate".

Various reactants can be used to obtain the compound of the present invention. The reactants can be chosen to provide a particular structure having certain linkages and, optionally, additional functional groups that are different from the functional groups represented by Chemical Structure (I). For example, the compound can be formed from reactants comprising: (i) a reaction product of: (a) a mono-aldo or keto functional compound comprising a hydroxyl functional group, an amino functional group, a thiol functional group, a carboxylic acid functional group, or any combination thereof; and (b) a hydrazide or hydrazone comprising a group represented by —$XR^1(R^5)_z$ that is attached to a carbon atom of the hydrazide or hydrazone, in which $R^1$ is an alkyl group, an aryl group, or an alkylaryl group; X is an oxygen, sulfur, or nitrogen; $R^5$ is an alkyl group, an aryl group, an alkylaryl group, or a hydrogen; z is 0 when X is oxygen or sulfur and z is 1 when X is nitrogen; and (ii) a component comprising two or more functional groups reactive with the hydroxyl functional group, the amino functional group, the thiol functional group, and/or the carboxylic acid functional group of the resulting reaction product of (i).

As used herein, a "mono-aldo or keto functional compound" refers to a compound that has only one aldo (aldehyde) or keto (ketone) functional group. As indicated, the mono-aldo or keto functional compound also comprises one or more functional groups selected from a hydroxyl functional group, an amino functional group, a thiol functional group, and a carboxylic acid functional group including combinations of such functional groups. Non-limiting examples of suitable mono-aldo or keto functional compounds include hydroxyacetophenone, hydroxybenzaldehyde, thioacetophenone, thiobenzaldehyde, aminoacetophenone, aminobenzaldehyde, acetylbenzaldehyde, levulinic acid, and combinations thereof.

Further, a "hydrazide" refers to a compound comprising a hydrazide functional group, and a "hydrazone" refers to a compound comprising a hydrazone functional group. It is appreciated that the hydrazides and hydrazones comprise reactive amino functional groups. As previously described, the hydrazide and hydrazone also comprises a group represented by —$XR^1(R^5)_z$ that is attached to a carbon atom of the hydrazide or hydrazone. Non-limiting examples of the previously described hydrazide and hydrazone components include carbazates, semicarbazides, carbazides, hydrazinecarbothioates, and combinations thereof.

It is appreciated that the aldo or keto functional group will react with the hydrazide or hydrazone functional group. The resulting reaction product will include one or more functional groups selected from a hydroxyl functional group, an amino functional group, a carboxylic acid functional group, and a thiol functional group as well as the group represented by —$XR^1(R^5)_z$.

The resulting reaction product previously described is further reacted with the two or more functional groups of component (ii). Particularly, the hydroxyl functional group, the amino functional group, the carboxylic acid functional group, and/or the thiol functional group of the reaction product of (i) is reacted with the two or more functional groups of component (ii) to form the compound of the present invention.

Component (ii) can be selected from various monomers and polymers provided that the monomers and polymers comprise two or more functional groups that are reactive with the hydroxyl functional group, the amino functional group, the thiol functional group, and/or the carboxylic acid functional group of the reaction product of (i). Non-limiting examples of functional groups reactive with the hydroxyl functional group, the amino functional group, the thiol functional group, and/or the carboxylic acid functional group of the reaction product of (i) include epoxy functional groups, ethylenically unsaturated groups such as (meth) acrylates, maleimides, alkyl and aryl halides, mesylates, tosylates, esters, nitriles, amides, and combinations thereof. It is appreciated that the monomer or polymer that forms component (ii) can be selected to provide certain linkages and, optionally, additional functional groups including, but not limited to, the linkages and additional functional groups previously described.

As previously described, when component (ii) is a polymer, component (ii) can comprise various types of polymers provided that the polymer has two or more functional groups that are reactive with the hydroxyl functional group, the amino functional group, the thiol functional group, and the carboxylic acid functional group of the reaction product of (i) as previously described. Non-limiting examples of polymers that can form component (ii) include any of the polymers previously described but which comprise two or more functional groups that are reactive with the hydroxyl functional group, the amino functional group, the thiol functional group, and/or the carboxylic acid functional group of the reaction product of (i). For instance, the compound can comprise a (meth)acrylate resin that comprises two or more functional groups that are reactive with the hydroxyl functional group, the amino functional group, the carboxylic acid functional group, and/or the thiol functional group of the reaction product of (i), such as epoxy functional groups for example. Further, the two or more functional groups reactive with the hydroxyl functional group, the amino functional group, the carboxylic acid functional group, and/or the thiol functional group of the reaction product of (i) can be pendant groups and/or terminal groups on the polymer.

The compound of the present can also be prepared with different reactants. For example, the compound can be obtained by reacting (i) a hydrazide or hydrazone comprising a group represented by —$XR^1(R^5)_z$ that is attached to a carbon atom of the hydrazide or hydrazone, in which $R^1$ is an alkyl group, an aryl group, or an alkylaryl group and X is an oxygen, sulfur, or nitrogen; $R^5$ is an alkyl group, an aryl group, an alkylaryl group, or a hydrogen; z is 0 when X is oxygen or sulfur and z is 1 when X is nitrogen; and (ii) a component comprising two or more functional groups reactive with an amino group (i.e. primary amino group) of the hydrazide or hydrazone functionality of (i).

The hydrazide or hydrazone can comprise any of the previously described hydrazides or hydrazones comprising a group represented by $-XR^1(R^5)_z$. Component (ii) can be selected from various monomers and polymers provided that the monomers and polymers comprise two or more functional groups that are reactive with the hydrazide or hydrazone functionality of (i). Non-limiting examples of functional groups reactive with the hydrazide or hydrazone functionality of (i) include ethylenically unsaturated functional groups, keto functional groups, aldo functional groups, epoxy functional groups, or any combination thereof. As used herein, "ethylenically unsaturated" refers to a group having at least one carbon-carbon double bond. Non-limiting examples of ethylenically unsaturated groups include, but are not limited to, (meth)acrylate groups, vinyl groups, and combinations thereof. It is appreciated that the monomer or polymer that forms component (ii) can be selected to provide certain linkages and, optionally, additional functional groups including any of the linkages and additional functional groups previously described, for example.

As previously described, when component (ii) is a polymer, component (ii) can comprise various types of polymers provided that the polymer has two or more functional groups that are reactive with the hydrazide or hydrazone functionality of (i) as previously described. Non-limiting examples of polymers that can form component (ii) include any of the polymers previously described but which comprise two or more functional groups that are reactive with the hydrazide or hydrazone functionality of (i). For instance, the compound can comprise a (meth)acrylate resin that comprises two or more functional groups that are reactive with the hydrazide or hydrazone functionality of (i), such as aldo and/or (meth)acrylate functional groups for example. Another non-limiting example is an epoxy functional acrylic resin that is first reacted with a carboxylic acid compound comprising a keto or aldo-functional group, such as levulinic acid, to add keto or aldo-functional groups on the acrylic resin prior to the reaction with the hydrazide or hydrazone functionality of (i). Further, the two or more functional groups that are reactive with the hydrazide or hydrazone functionality of (i) can be pendant groups and/or terminal groups on the polymer.

The previously described reactants and reaction products that form the compound of the present invention can be mixed and reacted in a liquid medium such as a non-aqueous medium and optionally in the presence of a catalyst such as in the presence of an amine catalyst. As used herein, the term "non-aqueous" refers to a liquid medium comprising less than 50 weight % water, based on the total weight of the liquid medium. In accordance with the present invention, such non-aqueous liquid mediums can comprise less than 40 weight % water, or less than 30 weight % water, or less than 20 weight % water, or less than 10 weight % water, or less than 5 weight % water, based on the total weight of the liquid medium. The solvents that make up more than 50 weight % and optionally up to 100 weight % of the liquid medium include organic solvents. Non-limiting examples of suitable organic solvents include polar organic solvents e.g. protic organic solvents such as glycols, glycol ether alcohols, alcohols; and aprotic organic solvents such as ketones, glycol diethers, esters, and diesters. Other non-limiting examples of organic solvents include non-polar solvents such as aromatic and aliphatic hydrocarbons.

The compound of the present invention can comprise at least 5 weight %, at least 10 weight %, at least 20 weight %, at least 40 weight %, or at least 60 weight % of the coating composition, based on the total solids weight of the coating composition. The compound of the present invention can comprise up to 100 weight %, up to 90 weight %, up to 80 weight %, or up to 70 weight % of the coating composition, based on the total solids weight of the coating composition. The compound of the present invention can include an amount with range such as, for example, of from 5 weight % to 100 weight %, or from 10 weight % to 90 weight %, or from 20 weight % to 80 weight % of the coating composition, based on the total solids weight of the coating composition.

As previously described, the compound can comprise one or more additional functional groups. These additional functional groups can be selected from functional groups that are reactive with the functional groups represented by Chemical Structure (I) such that the compound is self-crosslinkable. As used herein, the term "self-crosslinkable" refers to a compound comprising two or more functional groups that are reactive with each other and which participate in intramolecular and/or intermolecular crosslinking reactions to form a covalent linkage in the absence of other external reactive compounds. For instance, the compound of the present invention can also comprise hydroxyl functional groups, amino functional groups, thiol functional groups, and any combination thereof that are reactive with the functional groups represented by Chemical Structure (I).

The compound of the present invention can also be free of additional functional groups that are reactive with the functional groups represented by Chemical Structure (I) such that the compound is non-self-crosslinkable. As used herein, "non-self-crosslinkable" refers to a compound comprising one or more functional groups that are not reactive with each other and which thus requires one or more external compounds reactive therewith to undergo a crosslinking reaction.

When the crosslinking composition of the present invention contains the previously described non-self-crosslinkable compound, the composition further comprises a film-forming resin having functional groups reactive with the functional groups represented by Chemical Structure (I) of the non-self-crosslinkable compound. As used herein, a "film-forming resin" refers to a resin that can form a self-supporting continuous film on at least a horizontal surface of a substrate upon removal of any diluents or carriers present in the composition and/or upon curing.

Non-limiting examples of suitable film-forming resins include (meth)acrylate resins, polyurethanes, polyesters, polyamides, polyethers, polysiloxanes, epoxy resins, vinyl resins, copolymers thereof, and combinations thereof. Further, the film-forming resins comprise functional groups that are reactive with the functional groups represented by Chemical Structure (I) of the compound. Non-limiting examples of such functional groups include hydroxyl functional groups, amino functional groups, thiol functional groups, and any combination thereof. The film-forming resins can also include additional functional groups such as, for example, carboxylic acid groups, epoxide groups, carbamate groups, amide groups, urea groups, isocyanate groups (including blocked isocyanate groups), and combinations thereof.

The film-forming resin used with the present invention can also comprise an equivalent weight of 400 or less, or 300 or less, or 250 or less, or 200 or less, or 180 or less, or 150 or less. As used herein, "equivalent weight" refers to the average weight molecular weight of a resin divided by the number of functional groups. Further, the average weight molecular weight is determined by gel permeation chromatography relative to linear polystyrene standards of 800 to 900,000 Daltons as measured with a Waters 2695 separation module with a Waters 410 differential refractometer (RI detector). Tetrahydrofuran (THF) is used as the eluent at a flow rate of 1 ml min-1, and two PLgel Mixed-C (300×7.5 mm) columns is used for separation.

It is appreciated that the previously described compound can act as a crosslinker that reacts with the film-forming resin during cure to form a coating layer as explained in more detail below. As used herein, the term "crosslinker" refers to a molecule comprising two or more functional groups that are reactive with other functional groups and that is capable of linking two or more monomers or polymers through chemical bonds.

When included in the composition, the film-forming resin reactive with the functional groups represented by Chemical Structure (I) of the compound can comprise at least 5 weight %, at least 10 weight %, at least 20 weight %, at least 40 weight %, or at least 60 weight % of the coating composition, based on the total solids weight of the coating composition. The film-forming resin can comprise up to 95 weight %, up to 90 weight %, up to 80 weight %, or up to 70 weight % of the coating composition, based on the total solids weight of the coating composition. The film-forming resin of the present invention can include an amount within a range such as, for example, of from 5 weight % to 95 weight %, or from 10 weight % to 90 weight %, or from 20 weight % to 80 weight % of the coating composition, based on the total solids weight of the coating composition.

It is appreciated that a film-forming resin can also be added to the crosslinking composition that comprises the compound that is self-crosslinkable. The film-forming resin can be reactive with additional functional groups on the compound and/or the functional groups represented by Chemical Structure (I) such that the compound is reactive with itself and additional film-forming resins. The crosslinking composition that comprises the compound that is self-crosslinkable can also be free of such film-forming resins that are reactive with the self-crosslinkable compound.

The crosslinking composition of the present invention can also include both the previously described compound that is self-crosslinkable and the previously described compound that is non-self-crosslinkable. Such crosslinking compositions can also comprise a film-forming resin that is reactive with the self-crosslinkable and/or non-self-crosslinkable compounds. Alternatively, the crosslinking composition can be free of a film-forming resin that is reactive with the self-crosslinkable and/or non-self-crosslinkable compounds.

The crosslinking composition can also comprise additional components. For example, the coating composition can also comprise additional film-forming resins that are not reactive with the previously described self-crosslinkable and/or non-self-crosslinkable compounds. The additional resins can include any of a variety of thermoplastic and/or thermosetting resins known in the art. As used herein, the term "thermosetting" refers to resins that "set" irreversibly upon curing or crosslinking, wherein the polymer chains are joined together by covalent bonds. Once cured, a thermosetting resin will not melt upon the application of heat and is insoluble in solvents. As noted, the additional resins can also include a thermoplastic resin. As used herein, the term "thermoplastic" refers to resins that include polymeric components that are not joined by covalent bonds and, thereby, can undergo liquid flow upon heating.

The additional resins can be selected from various types of resins provided that the resins do not have functional groups that are reactive with the functional groups of the self-crosslinkable and/or non-self-crosslinkable compounds. For example, the additional resins can be selected from any of the resins previously described provided that the resins do not have functional groups that are reactive with the functional groups of the self-crosslinkable and/or non-self-crosslinkable compounds.

Compositions containing thermosetting resins are typically reacted with a crosslinker. As such, when additional film-forming resins are used in the crosslinking composition, the composition can comprise additional crosslinkers that are reactive with the additional film-forming resins. The thermosetting resins can also have functional groups that are reactive with themselves such that the additional resin is self-crosslinking.

Non-limiting examples of additional crosslinkers include polyhydrazides, carbodiimides, polyols, phenolic resins, epoxy resins, beta-hydroxy (alkyl) amide resins, hydroxy (alkyl) urea resins, oxazoline, alkylated carbamate resins, (meth)acrylates, isocyanates, blocked isocyanates, polyacids, anhydrides, organometallic acid-functional materials, polyamines, polyamides, aminoplasts, aziridines, and combinations thereof. The coating compositions of the present invention can also be free of additional film-forming resins and/or crosslinkers.

The crosslinking compositions can also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof.

Example dyes include, but are not limited to, those that are solvent and/or aqueous based such as phthalo green or blue, iron oxide, bismuth vanadate, anthraquinone, and perylene and quinacridone.

Example tints include, but are not limited to, pigments dispersed in water-based or water miscible carriers such as AQUA-CHEM 896 commercially available from Degussa, Inc., and CHARISMA COLORANTS and MAXITONER INDUSTRIAL COLORANTS commercially available from Accurate Dispersions Division of Eastman Chemical, Inc.

The colorant which can be used with the crosslinking composition of the present invention can also comprise a special effect composition or pigment. As used herein, a "special effect composition or pigment" refers to a composition or pigment that interacts with visible light to provide an appearance effect other than, or in addition to, a continuous unchanging color. Example special effect compositions and pigments include those that produce one or more appearance effects such as reflectance, pearlescence, metallic sheen, texture, phosphorescence, fluorescence, photochromism, photosensitivity, thermochromism, goniochromism, and/or color-change. Non-limiting examples of special effect compositions can include transparent coated mica and/or synthetic mica, coated silica, coated alumina, aluminum flakes, a transparent liquid crystal pigment, a liquid crystal coating, and combinations thereof.

Other non-limiting examples of components that can be used with the crosslinking composition of the present invention include plasticizers, abrasion resistant particles, fillers including, but not limited to, micas, talc, clays, and inorganic minerals, anti-oxidants, hindered amine light stabilizers, UV light absorbers and stabilizers, surfactants, flow and surface control agents, thixotropic agents, organic cosolvents, reactive diluents, catalysts, reaction inhibitors, corrosion-inhibitors, and other customary auxiliaries.

The components that form the coating composition can also be combined and/or mixed in a liquid medium. For example, the compound comprising functional groups represented by Chemical Structure (I) and optionally other components previously described can be combined and mixed in a non-aqueous or aqueous liquid medium.

As used herein, an "aqueous liquid medium" refers to a liquid medium comprising greater than 50 weight % water, based on the total weight of the liquid medium. Such aqueous liquid mediums can for example comprise at least 60 weight % water, or at least 70 weight % water, or at least 80 weight % water, or at least 90 weight % water, or at least 95 weight % water, or 100 weight % water, based on the total weight of the liquid medium. The solvents that, if present, make up less than 50 weight % of the liquid medium include organic solvents such as any of the organic solvents previously described for example.

The crosslinking compositions of the present invention can be used as a coating composition. As used herein, a "coating composition" refers to a composition that can form a coating over at least a portion of a substrate. It is appreciated that the crosslinking composition of the present invention can be used as a coating composition in various applications and can be applied to a wide range of substrates known in the coatings industry. For example, the coating composition of the present invention can be applied to automotive substrates and components (e.g. automotive vehicles including, but not limited to, cars, buses, trucks, trailers, etc.), industrial substrates, aircraft and aircraft components, marine substrates and components such as ships, vessels, and on-shore and off-shore installations, storage tanks, windmills, nuclear plants, packaging substrates, wood flooring and furniture, apparel, electronics, including housings and circuit boards, glass and transparencies, sports equipment, including golf balls, stadiums, buildings, bridges, and the like. These substrates can be, for example, metallic or non-metallic.

Metallic substrates include, but are not limited to, tin, steel (including electrogalvanized steel, cold rolled steel, hot-dipped galvanized steel, steel alloys, or blasted/profiled steel, among others), aluminum, aluminum alloys, zinc-aluminum alloys, steel coated with a zinc-aluminum alloy, and aluminum plated steel. As used herein, blasted or profiled steel refers to steel that has been subjected to abrasive blasting and which involves mechanical cleaning by continuously impacting the steel substrate with abrasive particles at high velocities using compressed air or by centrifugal impellers. The abrasives are typically recycled/reused materials and the process can efficiently removal mill scale and rust. The standard grades of cleanliness for abrasive blast cleaning is conducted in accordance with BS EN ISO 8501-1.

Further, non-metallic substrates include polymeric and plastic substrates including polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethylene terephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles, leather, both synthetic and natural, and the like. It is appreciated that the coating compositions can be applied to various areas of any of the previously described substrates to form a continuous solid coating such as over the body and edges of a substrate.

The coating composition of the present invention is particularly beneficial when applied to a metallic substrate. For example, the coatings of the present invention are particularly beneficial when applied to metallic substrates that are used to fabricate automotive vehicles, such as cars, trucks, and tractors.

The coating compositions of the present invention can be applied by any means standard in the art, such as electrocoating when used as an electrodepositable coating composition, spraying, dipping, rolling, brushing, and the like. As used herein, an "electrodepositable coating composition" refers to a composition that is capable of being deposited onto an electrically conductive substrate under the influence of an applied electrical potential.

The coatings formed from the coating compositions of the present invention can be applied to a dry film thickness, for example, of from 5 microns to 100 microns, or from 5 microns to 60 microns, or from 8 microns to 40 microns, or from 8 microns to 20 microns.

Once applied to the substrate, the composition can be dehydrated and cured to form the coating layer. The coating composition can be dehydrated and cured at temperatures of 165° C. or less, or 160° C. or less, or 140° C. or less, or 120° C. or less, or 100° C. or less, or 80° C. or less. The coating composition can be dehydrated and cured at ambient temperatures (e.g. 20° C.) to 165° C., or from ambient temperatures to 140° C., or from ambient temperatures to 120° C., or from ambient temperatures to 100° C., or from ambient temperatures to 80° C., or from 40° C. to 160° C., or from 40° C. to 140° C., or from 40° C. to 120° C., or from 40° C. to 100° C., or from 40° C. to 80° C. The terms "curable", "cure", and the like, mean that at least a portion of the resinous materials in a composition is crosslinked or crosslinkable.

The coating composition can be applied to a substrate to form a monocoat. As used herein, a "monocoat" refers to a single layer coating system that is free of additional coating layers. Thus, the coating composition can be applied directly to a substrate without any intermediate coating layer and cured to form a single layer coating, i.e. a monocoat. The coating composition can also be applied directly over a pretreated substrate as a monocoat. For example, the substrate can be pretreated with an iron phosphate treatment, zinc phosphate treatment, zirconium treatment, titanium treatment, or silane treatment.

Alternatively, the coating composition can be applied to a substrate as at least one coating layer in a multi-layer coating. For instance, the coating composition can be applied as a basecoat in a multi-layer coating. As used herein, a "basecoat" refers to a coating composition from which a coating is deposited onto a primer and/or directly onto a substrate, optionally, including components (such as pigments) that impact the color and/or provide other visual impact, and which may be overcoated with a protective and decorative topcoat. As used herein, a "primer" refers to a coating composition from which an undercoating may be deposited onto a substrate in order to prepare the surface for application of a protective or decorative coating system.

It is appreciated that the multi-layer coating can comprise multiple coating layers such as three or more, or four or more, or five or more, coating layers. For example, the previously described coating composition of the present invention can be applied as a first basecoat over substrate or a primer layer, and additional coating layers can be applied over the first basecoat layer as additional basecoats and/or topcoats.

The additional coating layers can be formed from a coating composition that includes a film-forming resin that is the same or different from each other. The additional coating layers can be prepared with any of the film-forming resins, crosslinkers, colorants, and/or other components previously described. Further, each coating composition can be applied as a dry-on-dry process where each coating composition is dried or cured to form a coating layer prior to application of another composition coating. Alternatively, all or certain combinations of each coating composition can be applied as a wet-on-wet process and dried or cured together.

It was found that coatings formed from the crosslinking compositions of the present invention can exhibit various desirable properties. For instance, coatings formed from the crosslinking compositions of the present invention can be formed at low dehydration/cure temperatures and/or provide good solvent resistance, and which do not have some of the drawbacks and concerns associated with isocyanate functional compounds, such as the use of volatile leaving groups.

The present invention is also directed to the following aspects.

A first aspect is directed to a crosslinking composition comprising: a compound comprising at least two functional groups that are each independently represented by Chemical Structure (I):

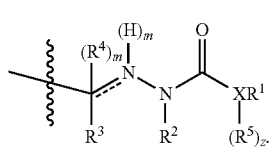

(I)

X is an oxygen, sulfur, or nitrogen; $R^1$ is an alkyl group, an aryl group, or an alkylaryl group; $R^2$, $R^3$, and $R^4$ are each independently an alkyl group, an aryl group, an alkylaryl group, or a hydrogen; $R^5$ is an alkyl group, an aryl group, an alkylaryl group, or a hydrogen; z is 0 when X is oxygen or sulfur and z is 1 when X is nitrogen; and when a double bond is formed between a carbon atom bonded to $R^3$ and an adjacent nitrogen, m is 0, and when a single bond is formed between the carbon atom bonded to $R^3$ and the adjacent nitrogen, m is 1; and wherein: (i) the compound further comprises one or more additional functional groups that are reactive with the functional groups represented by Chemical Structure (I) such that the compound is self-crosslinkable; and/or (ii) the composition further comprises a film-forming resin comprising functional groups that are reactive with the functional groups represented by Chemical Structure (I) of the compound.

A second aspect is directed to the crosslinking composition of the first aspect, wherein X is an oxygen.

A third aspect is directed to the crosslinking composition of the first or second aspect, wherein at least one of the functional groups of Chemical Structure (I) is represented by Chemical Structure (II):

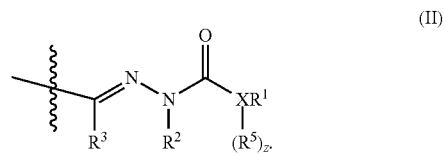

(II)

A fourth aspect is directed to the crosslinking composition of any of the preceding aspects, wherein at least one of the functional groups of Chemical Structure (I) is represented by Chemical Structure (III):

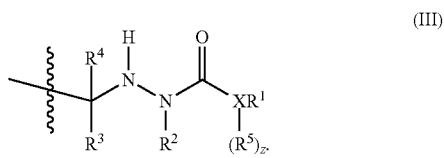

(III)

A fifth aspect is directed to the crosslinking composition of any of the preceding aspects, wherein (i) the compound further comprises the one or more additional functional groups that are reactive with the functional groups represented by Chemical Structure (I) such that the compound is self-crosslinkable.

A sixth aspect is directed to the crosslinking composition of the fifth aspect, wherein the additional functional groups comprise hydroxyl functional groups.

A seventh aspect is directed to the crosslinking composition of any of the preceding aspects, wherein the compound further comprises ester linkages, ether linkages, aromatic groups, or a combination thereof.

An eighth aspect is directed to the crosslinking composition of any of the preceding aspects, wherein the compound is obtained from reactants comprising: (i) a reaction product of: (a) a mono-aldo or keto functional compound comprising a hydroxyl functional group, an amino functional group, a carboxylic acid functional group, a thiol functional group, or any combination thereof; and (b) a hydrazide or hydrazone comprising a group represented by $-XR^1(R^5)_z$ that is attached to a carbon atom of the hydrazide or hydrazone, wherein $R^1$ is an alkyl group, an aryl group, or an alkylaryl group; X is an oxygen, sulfur, or nitrogen; $R^5$ is an alkyl group, an aryl group, an alkylaryl group, or a hydrogen; z is 0 when X is oxygen or sulfur and z is 1 when X is nitrogen; and (ii) a component comprising two or more functional groups reactive with the hydroxyl functional group, the amino functional group, the carboxylic acid functional group, and/or the thiol functional group of the reaction product of (i).

A ninth aspect is directed to the crosslinking composition of the eighth aspect, wherein (i) (a) the mono-aldo or keto functional compound comprises a hydroxyl functional group and (ii) the component comprises two or more epoxy functional groups reactive with the hydroxyl functional group of the reaction product of (i).

A tenth aspect is directed to the crosslinking composition of any one of the first through seventh aspects, wherein the compound is obtained from reactants comprising: (i) a hydrazide or hydrazone comprising a group represented by —$XR^1(R^5)_z$ that is attached to a carbon atom of the hydrazide or hydrazone, wherein $R^1$ is an alkyl group, an aryl group, or an alkylaryl group; X is an oxygen, sulfur, or nitrogen; $R^5$ is an alkyl group, an aryl group, an alkylaryl group, or a hydrogen; z is 0 when X is oxygen or sulfur and z is 1 when X is nitrogen; and (ii) a component comprising two or more functional groups reactive with an amino group of the hydrazide or hydrazone of (i).

An eleventh aspect is directed to the crosslinking composition of the tenth aspect, wherein the two or more functional groups of component (ii) comprise ethylenically unsaturated functional groups, keto functional groups, aldo functional groups, epoxy functional groups, or any combination thereof that are reactive with the amino group of the hydrazide or hydrazone of (i).

A twelfth aspect is directed to the crosslinking composition of any of the preceding aspects, wherein the composition further comprises (ii) the film-forming resin comprising functional groups reactive with the functional groups represented by Chemical Structure (I) of the compound.

A thirteenth aspect is directed to the crosslinking composition of the twelfth aspect, wherein the film-forming resin comprises hydroxyl functional groups, amino functional groups, thiol functional groups, or a combination thereof.

A fourteenth aspect is directed to the crosslinking composition of the twelfth or thirteenth aspect, wherein the film-forming resin has an equivalent weight of 400 or less.

A fifteenth aspect is directed to the crosslinking composition of any of the preceding aspects, wherein the crosslinking composition is a coating composition that forms a coating when cured.

A sixteenth aspect is directed to the crosslinking composition of the fifteenth aspect, wherein the coating composition is an electrodepositable coating composition.

A seventeenth aspect is directed to a substrate at least partially coated with the coating formed from the coating composition of the fifteenth or sixteenth aspect.

An eighteenth aspect is directed to the substrate of the seventeenth aspect, wherein the coating is formed directly over at least a portion of the substrate.

A nineteenth aspect is directed to the substrate of the seventeenth aspect, wherein the coating is formed over one or more additional coating layers formed over the substrate.

A twentieth aspect is directed to the substrate of any one of the seventeenth through nineteenth aspects, wherein one or more additional coating layers are formed over the coating.

The following examples are presented to demonstrate the general principles of the invention. The invention should not be considered as limited to the specific examples presented. All parts and percentages in the examples are by weight unless otherwise indicated.

EXAMPLE 1

Preparation of a Precursor

A precursor was prepared by charging 44.2 g hydroxyacetophenone, 29.28 g methyl carbazate, and 162.5 g isopropanol into a 1 L flask with a stirrer, a condenser, and a thermocouple under nitrogen blanket. The mixture was heated to reflux with a heating mantle and the reaction was monitored with TLC. Once the reaction was completed, isopropanol was removed with a Dean-Stark apparatus and 50 g xylene was added to disperse the precipitated solid. The mixture was stirred at 100° C. for 30 min. The reaction was cooled and the precipitate was collected by filtration. The precipitate was then washed with ethanol and dried to yield the product as an off-white solid. The resulting precursor was characterized as methyl 2-(1-(4-hydroxyphenyl)ethylidene)hydrazine-1-carboxylate.

EXAMPLE 2

Preparation of a Precursor

A precursor was prepared by charging 32.7 g hydroxyacetophenone, 25.0 g ethyl carbazate, and 112.5 g isopropanol into a 1 L flask with a stirrer, a condenser, and a thermocouple under nitrogen blanket. The mixture was heated to reflux with a heating mantle and the reaction was monitored with TLC. Once the reaction was completed, isopropanol was removed with a Dean-Stark apparatus and 50 g xylene was added to disperse the precipitated solid. The mixture was stirred at 100° C. for 30 min. The reaction was cooled and the precipitate was collected by filtration. The precipitate was then washed with ethanol and dried to yield the product as an off-white solid. The resulting precursor was characterized as ethyl 2-(1-(4-hydroxyphenyl)ethylidene)hydrazine-1-carboxylate.

EXAMPLE 3

Preparation of a Di-Functional Crosslinker

A di-functional crosslinker was prepared by 62.4 g of the precursor from example 1, 51.0 g Epon® 828 (difunctional bisphenol A/epichlorohydrin derived liquid epoxy, commercially available from Hexion), 7.65 g trimethylamine, and 195 g ethanol were charged into a 1 L flask with a stirrer, a condenser, and a thermocouple under nitrogen blanket. The reaction was heated to reflux with a heating mantle and the reaction was monitored with TLC. Once the Epon® 828 starting material was gone from TLC, the reaction was cooled down and filtered. The filtrate was concentrated with a rotary evaporator to yield the product as a crunchy yellow solid.

EXAMPLE 4

Preparation of a Di-Functional Crosslinker

A di-functional crosslinker was prepared by charging 12.93 g of the precursor from example 2, 10.88 g Epon™ 828 (difunctional bisphenol A/epichlorohydrin derived liquid epoxy, commercially available from Hexion), 1.63 g trimethylamine, and 83.2 g ethanol were charged into a 500 mL flask with a stirrer, a condenser, and a thermocouple under nitrogen blanket. The reaction was heated to reflux with a heating mantle and the reaction was monitored with TLC. Once the Epon™ 828 starting material was gone from TLC, the reaction was cooled down and filtered. The filtrate was concentrated with a rotary evaporator to yield the product as a crunchy yellow solid.

EXAMPLE 5

Preparation of a Tri-Functional Crosslinker

A tri-functional crosslinker was prepared by charging 5.0 g of the precursor from example 1, 2.38 g triglycidyl isocyanurate (TGIC), 0.5 g trimethylamine, and 15.0 g ethanol into a 500 mL flask with a stirrer, a condenser, and a thermocouple under nitrogen blanket. The reaction was heated to reflux with a heating mantle and the reaction was monitored with TLC. Once the starting materials were gone from TLC, the reaction was cooled down and filtered. The filtrate was concentrated with a rotary evaporator to yield the product as a crunchy yellow solid.

EXAMPLE 6

Preparation of a Di-Functional Crosslinker

A di-functional crosslinker was prepared by charging 10.0 g isophthalaldehyde, 19.71 g tert-butyl carbazate, and 130 g isopropanol into a 500 mL flask with a stirrer, a condenser, and a thermocouple under nitrogen blanket. The reaction was heated to reflux with a heating mantle and kept refluxing for 3 h. Solvent was removed with a Dean-Stark apparatus and 50 g xylene was added to disperse the precipitated solid. The mixture was stirred for 30 min at 100° C. The precipitate was filtered and washed with ethanol to yield the product as a white solid. The resulting crosslinker was characterized as di-tert-butyl 2,2'-(1,3-phenylenebis(methaneylylidene))-bis (hydrazine-1-carboxylate).

EXAMPLE 7

Preparation of a Di-Functional Crosslinker

A di-functional crosslinker was prepared by charging 40.50 g tert-butyl carbazate, 21.48 g of cyclohexanedicarboxaldehyde, and 141.86 g of xylene into a 500 mL flask with a stirrer, a condenser, and a thermocouple under nitrogen blanket. The reaction was subsequently heated to 100° C. with a heating mantle and stirred for 1 hour (a heat gun was periodically use to heat glassware and promote distillation of water to a Dean Stark trap). After cooling, the white solid was filtered and washed with xylene. The resulting crosslinker was characterized as di-tert-butyl 2,2'-(cyclohexane-1,3-diylbis(methaneylylidene))(2E,2'E)-bis(hydrazine-1-carboxylate).

EXAMPLE 8

Preparation of a Tri-Functional Crosslinker

A tri-functional crosslinker was prepared by charging 10.74 g of trimethylolpropane triacrylate, 14.34 g of tert-butyl carbazate, and 70.00 g of Dowanol™ PM (glycol ether solvent, commercially available from Dow) into a 500 mL flask with a stirrer, a condenser, and a thermocouple under nitrogen blanket. The reaction was subsequently stirred at ambient temperature for two days. Volatiles were removed under reduced pressure on a rotary evaporator to yield a clear viscous liquid.

EXAMPLE 9

Preparation of a Polymeric Crosslinker

A polymeric crosslinker was prepared by charging 261.17 g of keto-functional acrylic polymer (solid %: 50% in Dowanol™ PM, glycol ether solvent, commercially available from Dow) and 13.26 g of methylcarbazate into a 1 L flask with a stirrer, a condenser, and a thermocouple under nitrogen blanket. The reaction was heated to reflux with a heating mantle and the reaction was monitored with $^{13}$C-NMR. Once ketone $^{13}$C-NMR peak was gone from NMR, the reaction was cooled down and poured out to yield the product as a yellow liquid.

EXAMPLE 10

Preparation of a Polymeric Crosslinker

A polymeric crosslinker was prepared by charging 35.1 g of the precursor from example 1, 71.4 g epoxy-functional acrylic polymer [solid %: 63.3% in butylcellosolve-n-butanol (3:1)], 50 g butylcellosolve-n-butanol (3:1), and 0.3 g ethyltriphenylphosphonium iodide into a 1 L flask with a stirrer, a condenser, and a thermocouple under nitrogen blanket. The reaction was heated to reflux with a heating mantle and the reaction was monitored with titration. Once epoxy equivalent weight became undetectable, the reaction was cooled down and poured out to yield the product as a yellow liquid.

EXAMPLE 11

Preparation of a Polymeric Crosslinker

A polymeric crosslinker was prepared by charging 24.6 g of levulinic acid, 97.58 g epoxy-functional acrylic polymer [solid %: 63.3% in butylcellosolve-n-butanol (3:1)], 55 g butylcellosolve-n-butanol (3:1), and 0.4 g ethyltriphenylphosphonium iodide into a 1 L flask with a stirrer, a condenser, and a thermocouple under nitrogen blanket. The reaction was heated to reflux with a heating mantle and the reaction was monitored with titration. Once epoxy equivalent weight became undetectable, the reaction was cooled down. Then 19.27 g methylcarbazate was added to the flask and heated back to 105° C. The reaction was monitored with $^{13}$C-NMR. Once the ketone $^{13}$C-NMR peak was gone from NMR, the reaction was cooled down and poured out to yield the product as a yellow liquid.

EXAMPLE 12

Preparation of Coating Compositions and Coatings Formed Therefrom

Various coating compositions were prepared by mixing a hydroxyl functional acrylic resin with each of the crosslinkers of examples of 3-6 and 9-11 at a 1:1 equivalence ratio based on hydroxyl content of the acrylic resin. Next, the coating compositions were drawn down over 4 inches by 12 inches steel panels that were pre-coated with an ED 6465 electrocoat (an electrocoat commercially available from PPG) using a drawdown bar. The panels with wet films were flashed at ambient conditions for 5 minutes before being baked for 30 minutes at 80° C., 120° C., 140° C., and 160° C. in an oven. After bake, the panels were taken out of the oven and cooled down to room temperature. The dry film thickness was around 50-60 um.

For examples 7 and 8, the hydroxyl functional acrylic resin and solvent were charged into a 2 ounce jar, then mixed with a tongue depressor until the mixture was homogeneous. The crosslinkers were subsequently added to the jar (30% on non-volatile weight) and mixed until a homogeneous mixture was obtained. A thin line of the jar contents were then poured onto a CRS (cold rolled steel) C700 panel (not pre-ecoated) with 6"×8" dimensions. The contents were drawn down onto the C700 panel using a steel grated rod to yield a thickness of ~1 mil on the panel. The panel was then placed into a convection oven at a set temperature for one hour. Once the hour was complete, the panel was removed from the oven and cooled to room temperature.

EXAMPLE 13

Evaluation of Coatings

The coatings formed in example 12 using the crosslinkers of examples 3, 5, and 9-11 were tested for solvent resistance. Solvent resistance was tested using Wypall brand 03086 wipes (commercially available at Kimberly-Clark Professional Inc.) and a modified method of ASTM D 5402-06 according to the following procedure: one 8 inch by 1 inch area on the coated surface to test was marked; one piece of wipe was folded into a double thickness and saturated to a dripping wet condition with methyl ethyl ketone (MEK) solvent; an index finger was placed into the center of the folded wipe and the test area was rubbed at a 45° angle in which one forward and back motion was considered one double rub; repositioning the index finger on unused portions of the folded wipe and rub the test area with additional double rubs; and re-saturate the wipe every 25 double rubs. This procedure was repeated until there was a visible scratch/mar on the film.

For the coatings formed in example 12 using the crosslinkers of examples 7 and 8, solvent resistance was evaluated with acetone in which a test area was rubbed in a forward and backward motion horizontally along the panel with a double folded Wypall X80 wipe damped with acetone, the test area. For every 25 rubs, the wipe was damped once more with acetone solvent. Rubbing was continued until 100 rubs were counted or a visible scratch/mar in the system was observed.

The results of the solvent resistance testing are shown in Table 1.

TABLE 1

| Composition used to form Coating | Double rubs |
| --- | --- |
| Example 3 at 120° C. bake | 50 |
| Example 3 at 140° C. bake | >100 |
| Example 5 at 80° C. bake | 30 |
| Example 5 at 120° C. bake | 60 |
| Example 5 at 140° C. bake | >100 |
| Example 7 at 160° C. bake | >100 |
| Example 8 at 160° C. bake | 85 |
| Example 9 at 140° C. bake | 40 |
| Example 10 at 140° C. bake | >100 |
| Example 11 at 140° C. bake | >100 |

As shown in Table 1, the coatings formed from the compositions of the present invention comprising the compound having functional groups represented by the previously described Chemical Structure (I) exhibited good to excellent solvent resistance at various cure temperatures.

The rheology curves (phase angle) of the coatings formed in Example 12 using the crosslinkers of examples 3-6 were also evaluated. An Anton Paar MCR 301 instrument was used for the analysis. A 600 μL sample volume was placed on the instrument and a temperature ramp was run starting at 25° C. (10° C. ramps were held for 3 minutes). The program stops when the sample has reached a phase angle of 10°. Reaching a phase angle of 10° is associated with cure of the sample. The rheology curves (phase angle) are shown in Table 2.

TABLE 2

| Composition used to form Coating | Temperature of phase shift at 100 angle |
| --- | --- |
| Example 3 | 150° C. |
| Example 4 | 120° C. |
| Example 5 | 80° C. |
| Example 6 | 130° C. |

As shown in Table 2, the coatings of the present invention can provide 10° angle phase shifts at low temperatures.

EXAMPLE 14

Preparation and Evaluation of a Coating Formed with a Self-Crosslinkable System

A coating composition was prepared using the compound of Example 5 without additional resins such that the compound of Example 5 crosslinked with itself to form the coating. The coating composition was drawn down over 4 inch by 12 inch steel panels that were pre-coated with an ED 6465 electrocoat (an electrocoat commercially available from PPG) using a drawdown bar. The panels with wet films were flashed at ambient conditions for 5 minutes before being baked for 30 minutes at 80° C. and 140° C. in an oven. After bake, the panels were taken out of the oven and cooled down to room temperature. The dry film thickness was around 50-60 um.

The coatings were then tested for solvent resistance according to Example 13. The results of the solvent resistance testing are shown in Table 3.

TABLE 3

| Bake Temperature | Double rubs |
| --- | --- |
| 80° C. bake | >100 |
| 140° C. bake | >100 |

As shown in Table 3, the coatings formed from the compositions of the present invention comprising the compound of Example 5 as a self-crossinkable system exhibited excellent solvent resistance at various cure temperatures.

Whereas particular embodiments of this invention have been described above for purposes of illustration, it will be evident to those skilled in the art that numerous variations of the details of the present invention may be made without departing from the invention as defined in the appended claims.

The invention claimed is:
1. A crosslinking compound, comprising:
at least two functional groups that are each independently represented by Chemical Structure (I):

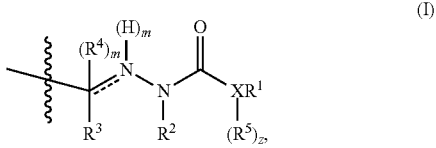

X is an oxygen, sulfur, or nitrogen;
$R^1$ is an alkyl group, an aryl group, or an alkylaryl group;
$R^2$, $R^3$, and $R^4$ are each independently an alkyl group, an aryl group, an alkylaryl group, or a hydrogen; and
$R^5$ is an alkyl group, an aryl group, an alkylaryl group, or a hydrogen;
z is 0 when X is oxygen or sulfur and z is 1 when X is nitrogen; and
when a double bond is formed between a carbon atom bonded to $R^3$ and an adjacent nitrogen, m is 0, and when a single bond is formed between the carbon atom bonded to $R^3$ and the adjacent nitrogen, m is 1, and wherein the crosslinking compound comprises a polymer that contains the functional groups represented by Chemical Structure (I), wherein the polymer comprises a (meth)acrylate polymer, a polyurethane polymer, a polyester polymer, a polyamide polymer, a polyether polymer, a polysiloxane polymer, an epoxy polymer, a vinyl polymer, copolymers thereof, and/or combinations thereof.

2. The crosslinking compound of claim 1, wherein X is an oxygen.

3. The crosslinking compound of claim 1, wherein at least one of the functional groups of Chemical Structure (I) is represented by Chemical Structure (II):

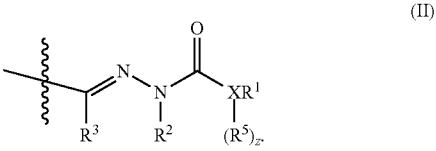

4. The crosslinking compound of claim 1, wherein at least one of the functional groups of Chemical Structure (I) is represented by Chemical Structure (III):

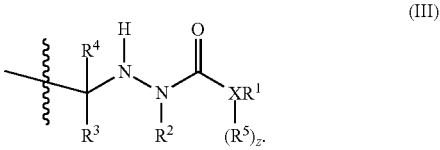

5. The crosslinking compound of claim 1, wherein the crosslinking compound further comprises one or more additional functional groups that are reactive with the functional groups represented by Chemical Structure (I) such that the crosslinking compound is self-crosslinkable.

6. The crosslinking compound of claim 5, wherein the additional functional groups comprise hydroxyl functional groups.

7. The crosslinking compound of claim 1, wherein the crosslinking compound further comprises ester linkages, ether linkages, aromatic groups, or a combination thereof.

8. The crosslinking compound of claim 1, wherein the compound is obtained from reactants comprising:

(i) a reaction product of:
  (a) a mono-aldo or keto functional compound comprising a hydroxyl functional group, an amino functional group, a carboxylic acid functional group, a thiol functional group, or any combination thereof; and
  (b) a hydrazide or hydrazone comprising a group represented by $-XR^1(R^5)_z$ that is attached to a carbon atom of the hydrazide or hydrazone, wherein $R^1$ is an alkyl group, an aryl group, or an alkylaryl group; X is an oxygen, sulfur, or nitrogen; $R^5$ is an alkyl group, an aryl group, an alkylaryl group, or a hydrogen; z is 0 when X is oxygen or sulfur and z is 1 when X is nitrogen; and
(ii) a component comprising two or more functional groups reactive with the hydroxyl functional group, the amino functional group, the carboxylic acid functional group, and/or the thiol functional group of the reaction product of (i).

9. The crosslinking compound of claim 8, wherein (i) (a) the mono-aldo or keto functional compound comprises a hydroxyl functional group and (ii) the component comprises two or more epoxy functional groups reactive with the hydroxyl functional group of the reaction product of (i).

10. The crosslinking compound of claim 1, wherein the compound is obtained from reactants comprising:
(i) a hydrazide or hydrazone comprising a group represented by $-XR^1(R^5)_z$ that is attached to a carbon atom of the hydrazide or hydrazone, wherein $R^1$ is an alkyl group, an aryl group, or an alkylaryl group; X is an oxygen, sulfur, or nitrogen; $R^5$ is an alkyl group, an aryl group, an alkylaryl group, or a hydrogen; z is 0 when X is oxygen or sulfur and z is 1 when X is nitrogen; and
(ii) a component comprising two or more functional groups reactive with an amino group of the hydrazide or hydrazone of (i).

11. The crosslinking compound of claim 10, wherein the two or more functional groups of component (ii) comprise ethylenically unsaturated functional groups, keto functional groups, aldo functional groups, epoxy functional groups, or any combination thereof that are reactive with the amino group of the hydrazide or hydrazone of (i).

12. A coating composition, comprising:
the crosslinking compound of claim 1,
wherein: (i) the crosslinking compound further comprises one or more additional functional groups that are reactive with the functional groups represented by Chemical Structure (I) such that the crosslinking compound is self-crosslinkable; and/or
(ii) the coating composition further comprises a film-forming resin comprising functional groups that are reactive with the functional groups represented by Chemical Structure (I) of the crosslinking compound.

13. The coating composition of claim 12, wherein the crosslinking compound comprises a monomer that contains the functional groups represented by Chemical Structure (I).

14. The coating composition of claim 1, wherein the polymer comprises a (meth)acrylate polymer.

15. The coating composition of claim 12, wherein (i) the crosslinking compound further comprises the one or more additional functional groups that are reactive with the functional groups represented by Chemical Structure (I) such that the crosslinking compound is self-crosslinkable, wherein the one or more additional functional groups comprise hydroxyl functional groups.

16. The coating composition of claim 12, wherein (ii) the coating composition further comprises the film-forming resin comprising functional groups that are reactive with the functional groups represented by Chemical Structure (I) of the crosslinking compound, wherein the film-forming resin comprises hydroxyl functional groups, ammo functional groups, thiol functional groups, or a combination thereof.

17. The coating composition of claim 16, wherein the film-forming resin comprises a hydroxyl-functional acrylic resin.

18. The coating composition of claim 12, wherein the coating composition is an electrodepositable coating composition.

19. A substrate at least partially coated with a coating formed from the coating composition of claim 12.

* * * * *